United States Patent [19]

Mizuoka et al.

[11] Patent Number: 5,007,097
[45] Date of Patent: Apr. 9, 1991

[54] LEAD'S POSITION RECOGNIZING DEVICE

[75] Inventors: Seiji Mizuoka, Katano; Kazumasa Okumura, Souraku, both of Japan

[73] Assignee: Matsushita Electric Industrial Co., Ltd., Kadoma, Japan

[21] Appl. No.: 545,892

[22] Filed: Jun. 29, 1990

[51] Int. Cl.⁵ .............................................. G06K 9/00
[52] U.S. Cl. ........................................ 382/8; 358/107
[58] Field of Search ..................... 382/8; 358/107, 101; 356/237

[56] References Cited

U.S. PATENT DOCUMENTS

| | | | |
|---|---|---|---|
| 4,644,583 | 2/1987 | Watanabe et al. | 358/107 |
| 4,656,896 | 4/1987 | Bietz et al. | 358/107 |
| 4,845,764 | 7/1989 | Ueda et al. | 382/8 |
| 4,929,843 | 5/1990 | Chmielewski, Jr. et al. | 358/107 |

*Primary Examiner*—Stephen Brinich
*Attorney, Agent, or Firm*—Wenderoth, Lind & Ponack

[57] ABSTRACT

A lead's position recognizing device including device for detecting positions of maximum points and minimum points on each outline of each region surrounded by adjacent leads or positions of a pair of corners on diagonal of each outline and a device for detecting the lead's position from intersecting point of a straight line connecting midpoints between said maximum point and minimum point taken at a given proportion or midpoints on diagonal of a pair of corners also taken at a given proportion and the outline.

It features the possibility of recognizing the lead's position by the use as positional information of the maximum and minimum points of the outline or the positions of a pair of corners on the diagonal of the outline which remain unchanged even if the given IC parts are turned or have changes in shape such as burrs.

2 Claims, 3 Drawing Sheets

LEAD'S POSITION RECOGNIZING DEVICE

BACKGROUND OF THE INVENTION

1. Field of the Invention

The present invention relates to a lead's position recognizing device used for detecting the lead's position of IC parts, forward ends of leads thereof being connected with film in a manufacturing step of mounting IC parts.

2. Description of the related art

As seen from FIG. 5, a conventional lead's position recognizing device used in an IC parts mounting machine is of the type recognizing a position of the lead 34 through detection of two corners 32, 33 on the lead's forward end side by the so-called template matching method, its composition being as shown in FIG. 4.

That is, an image signal from a TV camera 26 is converted into a binary image by a binary coding means 27 and stored in an image memory 28. The stored image information is taken out according to instructions from a control part or computer 31 and matched with a template taken out of a template memory 29 in a matching means 30, and positional information of the matched points is sent to the computer 31. The computer 31 recognizes the lead's position from the positional information sent from the matching means 30.

In the aforementioned composition, however, there are such problems as it is required to increase the number of template in order to make given IC parts recognizable even if they are rotated off each normal position and, moreover, the time required for matching increases with increasing memory capacity for storing templates.

Another problem is that, when the corner part has changes in shape such as burrs, the degree of matching between the image information and the template is lowered to make recognition impossible.

It is, therefore, an object of the present invention to provide a lead's position recognizing device capable of recognizing the lead's position without the necessity of a large capacity template memory even if the IC parts in question are subject to rotation or there are changes in the shape of some corner parts.

SUMMARY OF THE INVENTION

Accordingly, an essential object of the present invention is to provide a lead's position recognizing device comprising means for detecting the maximum and minimum points of each contour line in each region surrounded by adjacent leads or the positions of a pair of corners on the opposite sides of the diagonal of each contour line and a means for detecting the lead's position from the intersecting point of the straight line connecting the midpoints taken at a given proportion on the diagonal between a pair of corners on the one hand and the contour line on the other.

The present invention relating to the aforementioned composition enables recognition of the lead's position without the necessity of any large-size template memory by the use of information about the maximum and minimum points of the contour line or the positions of the corners of the diagonal of the contour line which can be obtained regardless of rotation of IC parts or changes in shape such as barrs.

BRIEF DESCRIPTION OF THE DRAWINGS

This and other objects and features for the present invention will become apparent from the following description taken in conjunction with reference to the accompanying drawings, in which.

DETAILED DESCRIPTION OF THE INVENTION

Figure 1:
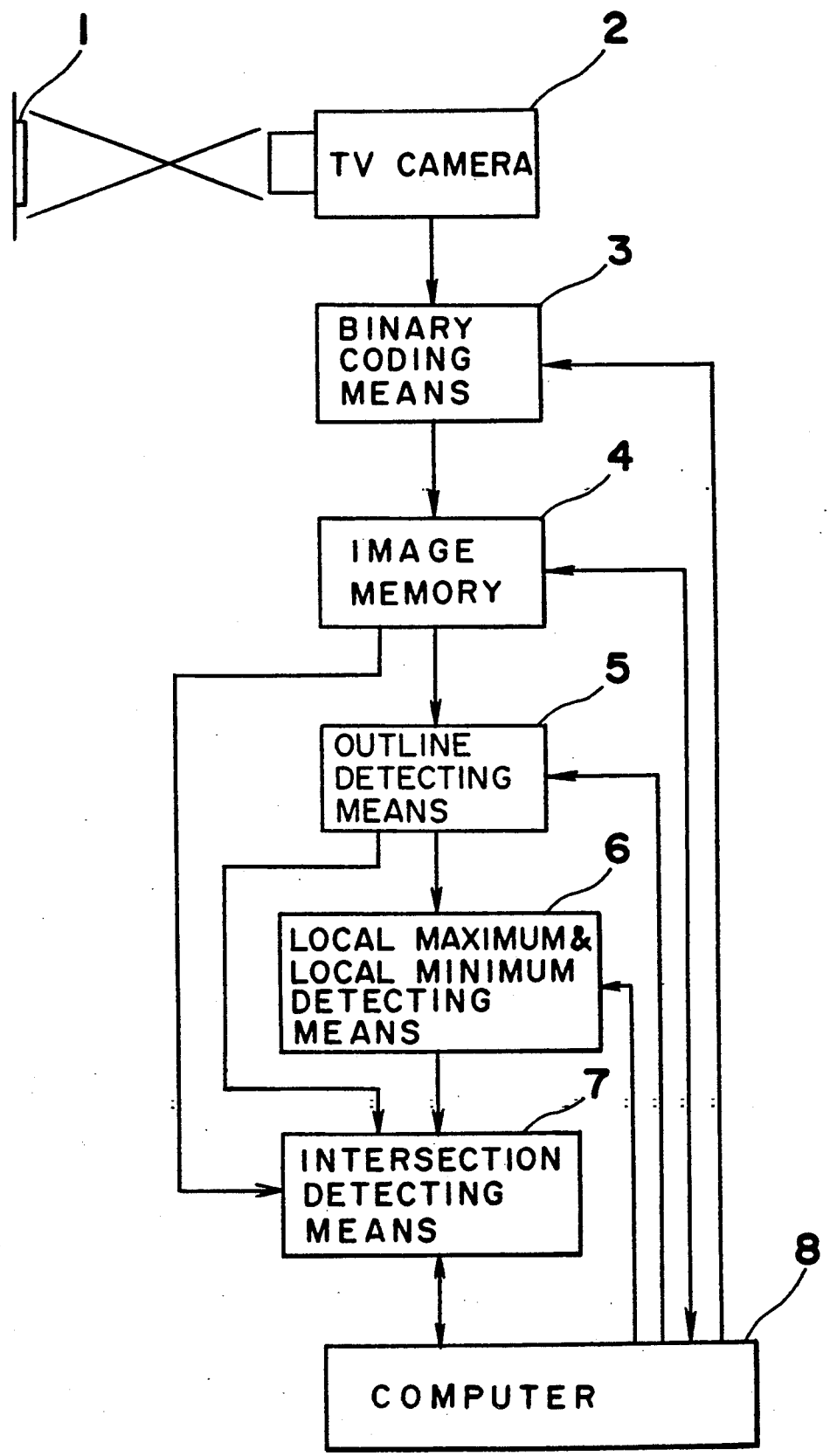
FIG. 1 is a block diagram of a lead's position recognizing device as one embodiment of the present invention.

Before the description of the present invention proceeds, it is to be noted that like parts are designated by like reference numerals throughout the accompanying drawings.

Referring to FIGS. 1-4, explanation will be given below about a lead's position recognizing device as a preferred embodiment of the present invention.

Figure 2:
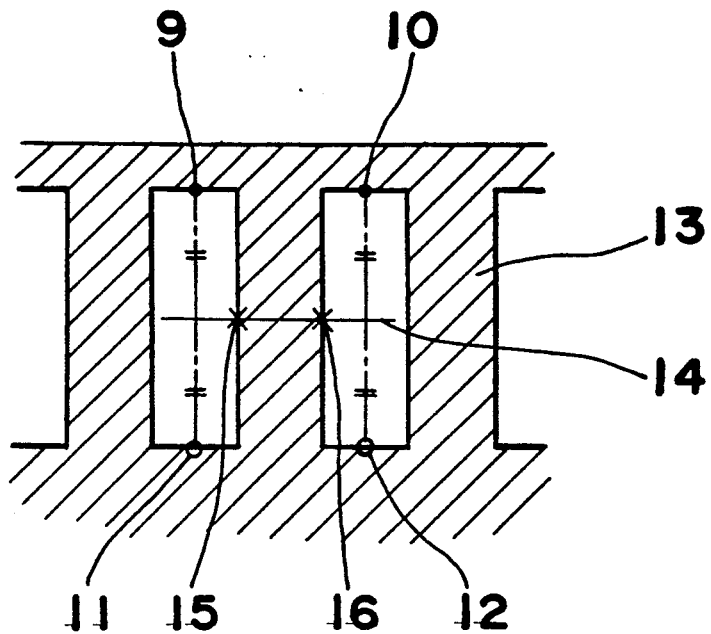
FIG. 2 is an illustrative view showing an example of the procedure for detecting the intersecting point of the straight line connecting the midpoints between the maximum points and minimum points on the outline and the outline.

FIG. 1 is a block diagram of the lead's position recognizing device as an embodiment of the present invention In FIG. 1 an image signal of a recognition object 1 outputted from a TV camera 2 is converted into a binary image by a binary coding means 3 and stored in an image memory 4. The stored image information is detected by a outline detecting means 5 according to the instructions from a control part, or a computer, 8 and the information about the position on X-Y coordinates of each outline in two adjacent regions surrounded by leads. A local maximum and local minimum detecting means 6 obtains, as shown in FIG. 2, one of maximum points 9, 10 and one of minimum points 15, 16 on each outline in the region surrounded by leads from the positional information about each outline stored in the outline detecting means 5. An intersecting point detecting means 7 obtains, as shown in FIG. 2, intersecting points 15, 16 of the straight line 14 connecting the midpoints of the maximum points 9, 10 and of the minimum points 11, 12 on the one hand and the outline on the other.

The computer 8 detects the lead's position from the intersecting points 15, 16 obtained by the intersection detecting means 7.

Since, in the aforementioned embodiment the intersecting point of the straight line connecting the midpoint between the maximum point and the minimum point and the outline is used as the positional information, the position of the straight line connecting the midpoints remains unaltered if the maximum or minimum point is displaced due to barrs or the like in the lead, hence the intersecting point of the aforementioned straight line and the outline remains the same and thus the lead's position can be detected regardless of any change in its shape.

Figure 3:
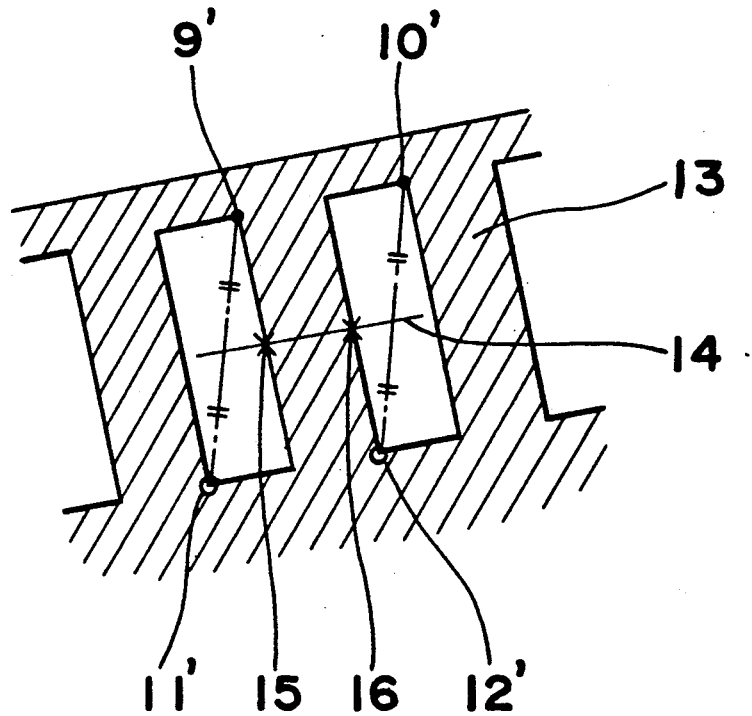
FIG. 3 is another illustrative view showing an example of the procedure for detecting the intersecting point of the straight line connecting the midpoints between the maximum points and minimum points on the outline and the outline when the IC parts are rotated.
Figure 4:
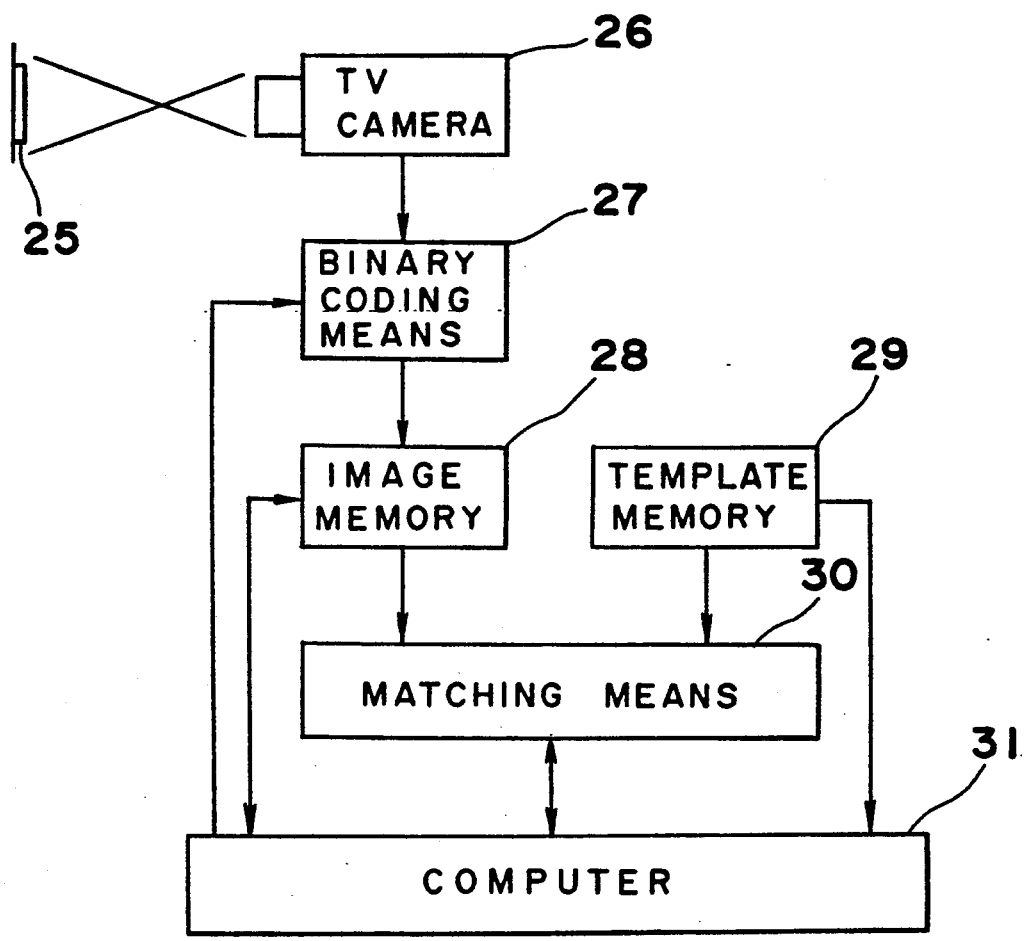
FIG. 4 is a block diagram of the conventional lead position recognition device.
Figure 5:
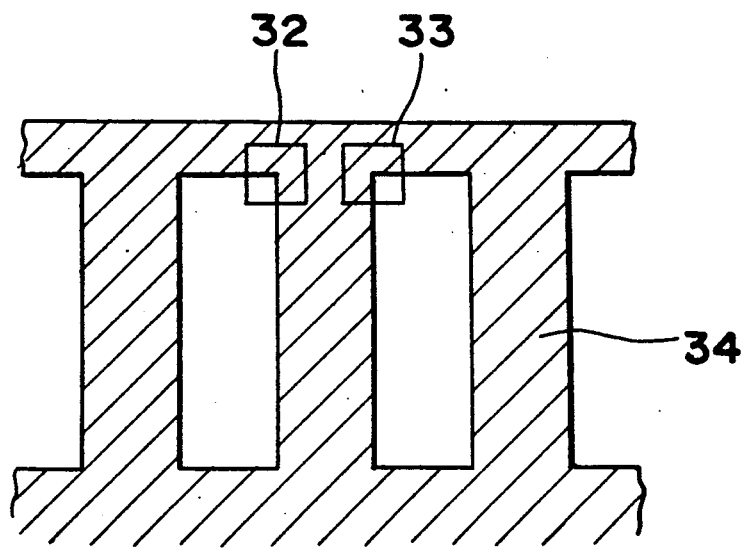
FIG. 5 is still another illustrative view showing an example of the so-called template matching method for a conventional lead's position recognizing device.

FIG. 2 shows a case where an IC part is at the normal position, and in the above the method of detecting the lead's position in this case has been described but, as seen from FIG. 3, this method is applicable to detection of the lead's position in the same way even if the IC parts are rotated off their normal positions by a given extent. It will be apparent from FIG. 3, in which the parts corresponding to those shown in FIG. 2 are given like reference numerals or with addition of "'".

Although in this embodiment the intersection detecting means 7 is for detecting the intersecting points of the midpoints between the maximum and minimum points on the one hand and the outline on the other, to be determined are the intersecting points of the straight line connecting the midpoints between the maximum points and the minimum points of each outline taken at a given proportion on the one hand and the outline on the other. The aforementioned midpoint between the maximum point and the minimum point connected by the straight line represents a proportion of 1:1.

The local maximum and local minimum points detecting means 6 in this embodiment may as well be a corner detecting means for determining a pair of corners positioned on the diagonal of each outline and, in so doing, the lead's position is detectable by replacing the maximum and the minimum points with a pair of corners.

In this modification the position of the lead's forward end is detectable with a high reliability for the midpoint of the lead's forward end can be detected even if the given IC part should rotate.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A lead's position recognizing device comprising:
   a means for detecting outlines of regions surrounded by adjacent leads;
   a means for detecting maximum points and minimum points of each outline; and
   a means for detecting a position of said lead from intersecting point of a straight line connecting midpoints between maximum points and minimum points on each outline taken at a given proportion and said outline.

2. A lead's position recognizing device comprising:
   a means for detecting outlines of regions surrounded by adjacent leads;
   a means for detecting positions of a pair of corners on diagonal of said each outline; and
   a means for detecting a position of said lead from intersecting point of a straight line connecting midpoints on diagonal connecting a pair of corners of each outline.

* * * * *

UNITED STATES PATENT AND TRADEMARK OFFICE
CERTIFICATE OF CORRECTION

PATENT NO. :   5,007,097

DATED      :   April 9, 1991

INVENTOR(S) :  Seiji MIZUOKA et al.

It is certified that error appears in the above-identified patent and that said Letters Patent is hereby corrected as shown below:

Title Page, after line [22], add

[30]  Foreign Application Priority Data
      June 30, 1989 [JP] Japan .................. 1-170120[P]

Signed and Sealed this

Thirteenth Day of October, 1992

Attest:

DOUGLAS B. COMER

Attesting Officer

Acting Commissioner of Patents and Trademarks